United States Patent
Hong et al.

(10) Patent No.: US 8,224,057 B2
(45) Date of Patent: Jul. 17, 2012

(54) METHOD AND SYSTEM FOR NODULE FEATURE EXTRACTION USING BACKGROUND CONTEXTUAL INFORMATION IN CHEST X-RAY IMAGES

(75) Inventors: Lin Hong, Monmouth Junction, NJ (US); Hong Shen, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 957 days.

(21) Appl. No.: 12/286,968

(22) Filed: Oct. 3, 2008

(65) Prior Publication Data
US 2009/0103797 A1    Apr. 23, 2009

Related U.S. Application Data

(60) Provisional application No. 60/980,866, filed on Oct. 18, 2007.

(51) Int. Cl.
G06K 9/46 (2006.01)
G06K 9/78 (2006.01)
G06T 7/60 (2006.01)
G01N 23/04 (2006.01)

(52) U.S. Cl. .......... 382/132; 382/130; 382/190; 378/62; 378/901

(58) Field of Classification Search .......... 382/128, 382/130–132, 195, 199, 203, 209, 210, 216–221, 382/225–228, 256–266, 270–273, 286, 291, 382/325; 378/51, 53, 62, 65, 91, 98, 98.8, 378/204, 210, 901; 607/901
See application file for complete search history.

(56) References Cited

U.S. PATENT DOCUMENTS

| | | | |
|---|---|---|---|
| 5,289,374 A | 2/1994 | Doi et al. | |
| 5,987,094 A | 11/1999 | Clarke et al. | |
| 6,088,473 A | 7/2000 | Xu et al. | |
| 6,549,646 B1 | 4/2003 | Yeh et al. | |
| 6,654,728 B1 | 11/2003 | Li et al. | |
| 6,760,468 B1 | 7/2004 | Yeh et al. | |
| 6,898,303 B2 | 5/2005 | Armato, III et al. | |
| 7,295,870 B2 | 11/2007 | Allain et al. | |
| 7,305,111 B2 | 12/2007 | Arimura et al. | |
| 2004/0151356 A1* | 8/2004 | Li et al. | 382/131 |
| 2004/0184647 A1* | 9/2004 | Reeves et al. | 382/131 |
| 2008/0002870 A1 | 1/2008 | Farag et al. | |
| 2008/0298666 A1* | 12/2008 | Mysore Siddu et al. | 382/132 |

FOREIGN PATENT DOCUMENTS

WO    WO 2006054271 A2 *    5/2006

* cited by examiner

Primary Examiner — Anastasia Midkiff

(57) ABSTRACT

A method and system for nodule feature extract using background contextual information in chest x-ray images is disclosed. In order to detect false positives in nodule candidates for a chest x-ray image, background contextual information, such as contextual vessel tree information, is defined in the chest x-ray image. Features are extracted for each nodule candidate based on the background contextual information, and the extracted features are used to detect whether each nodule candidate is a false positive or a genuine nodule.

23 Claims, 7 Drawing Sheets

Input:   The Raw image I(x,y), the gradient image G(x,y), and the lung segmentation mask, S(x,y).

Output:   A multiple level representation of propagated vessel trees, V(x,y)

Algorithm:
1. Initialize V to zero.
2. Search around the middle low section of the inner boundary of S to place the initial vessel tree templates. Set the boundary pixels that are inside the initial templates and S as the initial front pixels and set the propagation distance to zero for each pixel in the initial templates.
3. For each of the four confidence levels, cth, do the following
   a. Label all the pixel (x,y) as a current vessel tree pixel if
      i. (x,y) is a eight connected neighbor to a front pixels
      ii. C(x,y) > cth
   b. Update front pixel. Label all the newly added pixels as front pixels and remove all the pixels that are previously labeled front but are 8-connected to only vessel tree pixels already labeled.
   c. Set the propagation distance of the newly added front pixels by adding 1 to minimum neighbor propagation distance.
   d. If the percentage of newly added front pixels is larger than a threshold, Tf, go to a, otherwise go to e.
   e. Compute Wt for each of the connected components formed by the newly added front pixels. If it is less than a predefined threshold, (from 80-200), all the pixels in the connected component is removed from the vessel trees. Wt is computed as a weighted sum of the size of the connect component and the average propagation distance. Perform the same analysis on the connected components formed by the newly added front pixels and the front pixels labeled in the previous iterations.
   f. Compute the shape factor of a generated vessel tree. If its value is larger than a predefined threshold, (0.3), the vessel tree is removed.
   g. Fill in all small hole (<8 pixels) in the vessel tree background regions.
   h. Form the current level of vessel tree regions which consist of the newly added front pixels and the front pixels labeled in the previous iterations in V.
4. Return V.

FIG. 5

METHOD AND SYSTEM FOR NODULE FEATURE EXTRACTION USING BACKGROUND CONTEXTUAL INFORMATION IN CHEST X-RAY IMAGES

This application claims the benefit of U.S. Provisional Application No. 60/980,866, filed Oct. 18, 2007, the disclosure of which is herein incorporated by reference.

BACKGROUND OF THE INVENTION

The present invention relates to detecting nodules in chest x-ray images, and more particularly, to nodule feature extraction in chest x-ray images.

Lung cancer is a leading cause of all cancer deaths, and the survival rate can be significantly improved if it is detected in an early stage. Chest x-ray radiographs are a popular and cost effective way to perform initial examination and screening for lung cancer. In particular, chest x-ray radiographs are used to detect lung nodules. Nodules are small masses of tissue, which can form on various organs in the human body, such as the lungs. However, lung cancer diagnosis using chest x-ray radiographs can be very difficult cognitively. Such diagnosis typically requires a radiologist to make decisions based on clues, which can be extremely difficult to decipher.

A number of techniques have been developed to improve the effectiveness and efficiency of lung nodule detection by a radiologist, including dual energy subtraction, image enhancement, and computer aided lung nodule detection. In particular, computer aided lung nodule detection techniques have been proposed to automatically detect lung nodules in chest x-ray images. Unfortunately, an automatic nodule detection technique that is able to effectively cope with variations of chest x-ray images including different image characteristics, different types of nodules, and different background structures is not yet available. Significant advancements are needed to make automatic nodule detection in chest x-ray radiographs a practically applicable technique.

Automatic nodule detection is typically performed by deriving discriminating features and designing classifiers that can effectively remove false positives from a list of candidates. Features that can effectively differentiate genuine nodules from similar background structures are difficult to extract. Only a limited number of effective feature extraction techniques have been proposed. Adaptive ring filtering based techniques evaluate the center pointed convergence of gradient vectors inside a region of interest surrounding a nodule. This depends only on the orientation distribution of the gradient vector and is independent of the intensity and contrast. The adaptive ring filtering based techniques can handle some weak nodules and capture some nodule structure information. However, a major disadvantage of such techniques is that they fail to incorporate sufficient nodule shape information when accumulating convergence evidence. Matching filtering based techniques apply filters with shapes similar to nodules to an input image to enhance the genuine nodules while attempting to suppress false positives and/or other background anatomical structures. Features are then extracted from the enhanced image. A number of matching filtering based techniques have been proposed, including Gaussian filters, learned (average) nodule shape filters, and Laplacian of Gaussian (LoG) filters. Matching filtering based techniques are able to remove a significant number of false positives, but have a limited capability in tolerating complex background structures. They also lack the capability to handle weak nodules.

An important issue in nodule feature extraction is the localization of an effective region of interest. For example, a snake model can be used to locate a nodule boundary for further feature extraction. However, nodule boundary localization is as difficult as nodule detection itself, if not more difficult. The snake model approach is ineffective in handling background structures and weak nodules. A blob feature extraction algorithm uses a set of robust criteria to establish a ring of interest and then uses a set of criteria to impose a robust validation within the ring of interest to accumulate evidence. This performs better than the features described above, but it is still a local feature based technique.

Conventional learning based techniques extract features (typically, simple features) at a given candidate position and/or nearby regions and feed them to a pre-trained classifier to determine whether a candidate is a false positive or not. There is no theoretic problem with learning based techniques as long as a large number of representative false positive samples and genuine nodule samples are available, adequate features are extracted, and the classifiers being used are capable of obtaining "true" decision boundaries. Practically, this is generally not feasible. It is not practical to assume that adequate features are readily available. Accordingly, relying solely on a learned classifier to dig out false positives may not be a feasible approach, since the features used by the learned classifier may not be sufficient in discriminating genuine nodules from false positives. In addition, there are rarely enough representative genuine nodule samples available to enable robust learning. The lack of discriminating capability of features and insufficient number of representative samples invariantly limit learning based techniques in practical applications.

Even though a significant amount of research has been concentrated on the issue of deriving effective features to differentiate nodules from false positives, the nodule feature extraction problem is far from solved. Therefore, an improved feature detection method, which overcomes the ineffectiveness of the current techniques, is desirable.

BRIEF SUMMARY OF THE INVENTION

The present invention provides a method for extracting features for nodule detection in chest x-ray images. Embodiments of the present invention detect features by exploring the difference between a nodule and underlying background information, instead of finding the most prominent image properties. The use of contextual background information of chest x-ray images in extracting nodule features improves the discriminating capability of the extracted feature, resulting in features having increased effectiveness in differentiating genuine nodules from false positives.

In one embodiment of the present invention, features are extracted in a chest x-ray image in order to detect false positives in nodule candidates for the chest x-ray image. The nodule candidates can be detected using an automatic nodule detection method. Background contextual information is defined in the chest x-ray image. The background contextual information may be defined by generating a representation of vessel trees in the chest x-ray image. Features are extracted for each nodule candidate based on the background contextual information, such as the vessel tree information, and the extracted features are used to detect whether each nodule candidate is a false positive or a genuine nodule.

These and other advantages of the invention will be apparent to those of ordinary skill in the art by reference to the following detailed description and the accompanying drawings.

BRIEF DESCRIPTION OF THE DRAWINGS

FIG. 5 illustrates pseudo-code 500 for implementation the front propagation algorithm according to an embodiment of the present invention;

DETAILED DESCRIPTION

The present invention is directed to a method for extracting nodule features using contextual background information in chest x-ray images. Embodiments of the present invention are described herein to give a visual understanding of the feature extraction method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

The foundations that current nodule detection techniques are based on are (1) nodules in chest x-ray radiographs are round-shaped blobs with some limited intensity difference (sometimes almost non-difference) from the rest of background structures and (2) nodule features should effectively capture such characteristics to be useful. However, such foundations do not always fit reality. In some situations, false positives fit the blob model better than genuine nodules themselves. For example, in vessel tree regions, certain vessel crossings or perpendicular vessels may form blob like formations which are more prominent than those formed by genuine nodules. Conventional nodule features are not effective in differentiating such nodules like false positive blobs. In the conventional techniques described above, there is a common core of how features are extracted. In such conventional techniques, features are extracted inside localized regions of interest, which are generated explicitly or implicitly by the feature extraction algorithms. Computation is restricted inside a local region of candidate position. The contextual background of a wide or global view in which the candidate resides is ignored completely. Since, by using such conventional features, a false positive may be considered more like a perfect nodule blob than a genuine nodule, it is difficult to use such features to effectively differentiate it from genuine nodules. For example, the adaptive ring filtering based technique explores the neighborhood of a candidate position to locate a ring with maximum amount of center pointed pixels and to derive corresponding feature values. The exploration operation in the adaptive ring filtering technique is limited to a local neighborhood (no matter how large the local neighborhood is) and completely ignores the contextual background. This technique lacks an effective mechanism to handle a global context. A perpendicular vessel in a chest x-ray image may form a perfect circular blob, which is essentially indistinguishable from a perfect genuine nodule using such adaptive ring features.

Figure 1:
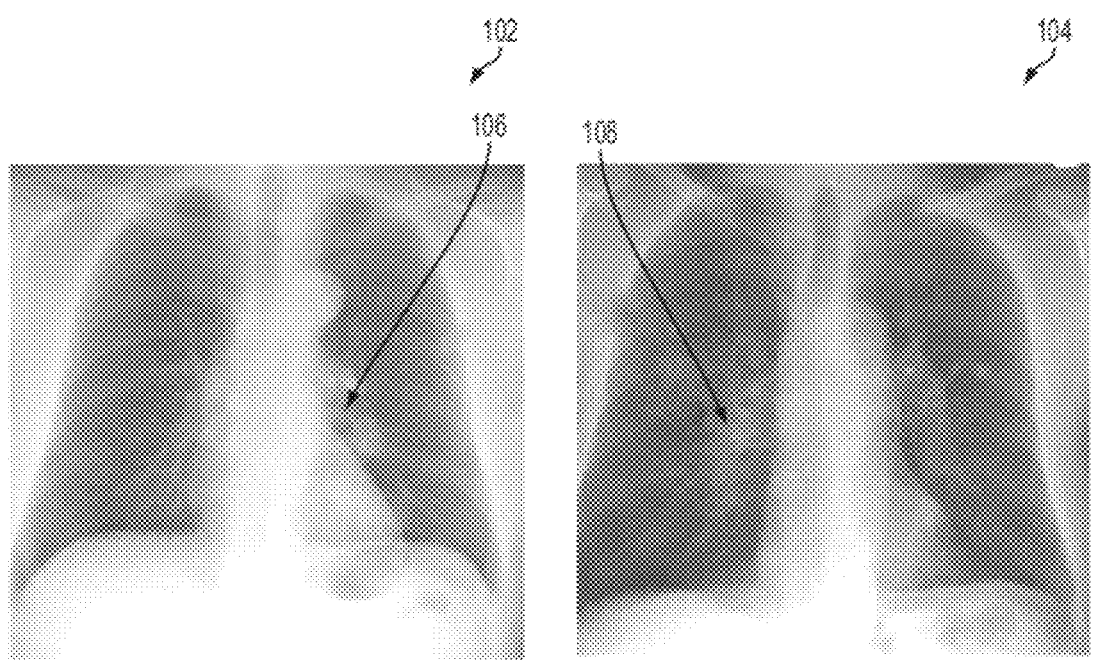
FIG. 1 illustrates nodule-like vessel structures in chest x-ray images.

Embodiments of the present invention extract nodule features under a wide or global background context. The present inventors have observed that conventional feature extraction techniques do not rely on contextual background information to compute feature values, without which many false positives are not differentiable from genuine nodules. For example, vessel trees in a chest x-ray image appear as clouds of relative high intensity clusters with a significant number of nodule shaped blobs. This contributes a type of false positive that is indistinguishable from genuine nodules, especially in the late stage of false positive removal. FIG. 1 illustrates nodule-like vessel structures in chest x-ray images. As illustrated in FIG. 1, images 102 and 104 are chest x-ray images with nodule-like vessel tree structures. In images 102 and 104, a number of vessel tree clusters 106 and 108 at the regions near the mediastinum appear more like genuine nodules than actual genuine nodules using conventional nodule features. Accordingly, the conventional nodule features are not capable of identifying such vessel tree clusters as false positives. However, the vessel tree structures nearby clearly provide useful indication that these are not genuine nodules. The feature extraction technique of the present invention represents a novel approach to assess properties that are relevant in differentiating false positives from genuine nodules.

Figure 2:
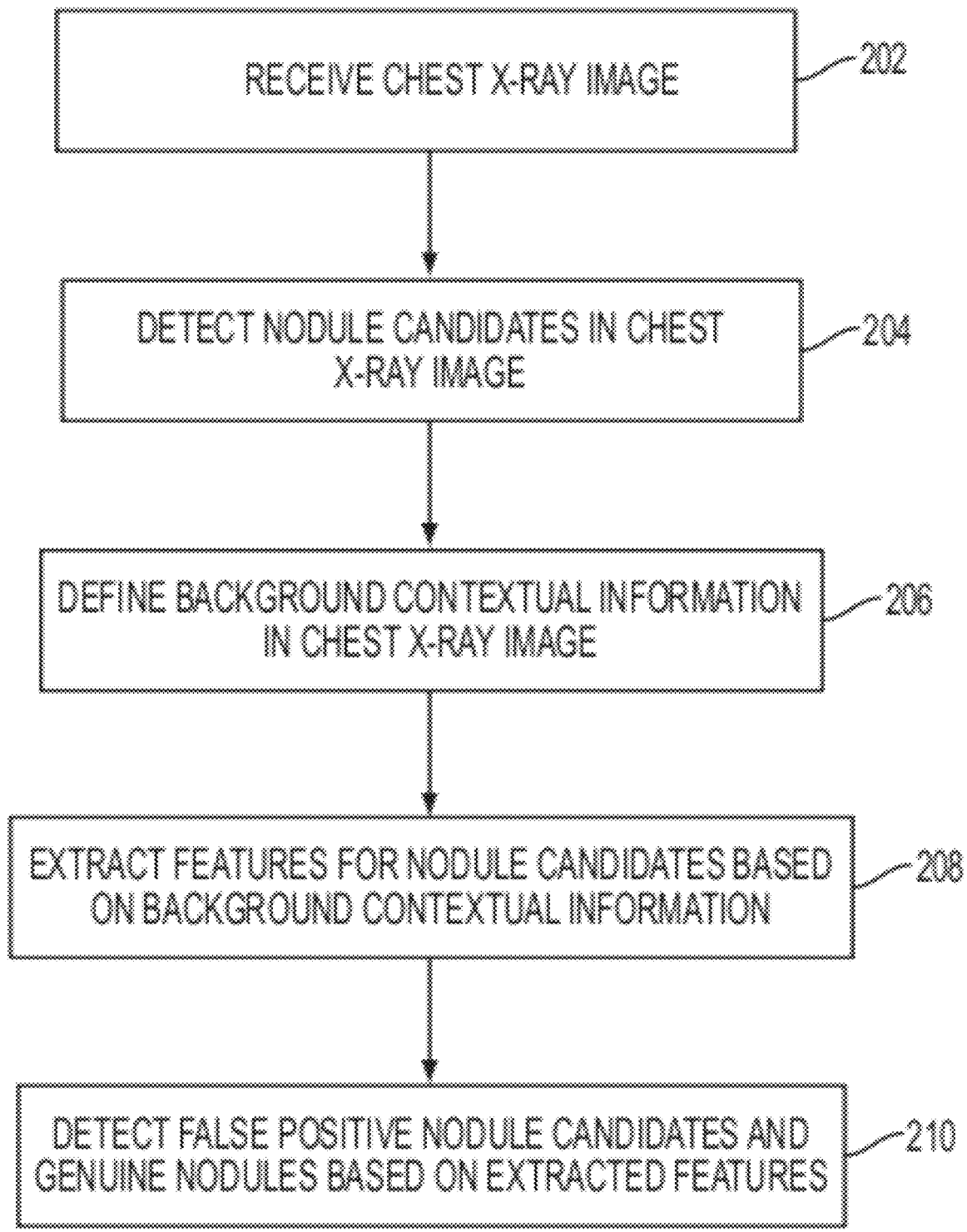
FIG. 2 illustrates a method for nodule detection and nodule feature extraction using background contextual information according to an embodiment of the present invention.

Embodiments of the present invention are directed to an extraction technique that isolates prominent background structures in a chest x-ray image before feature extraction, and calculates features under the context of a global view of the isolated contextual background structures. FIG. 2 illustrates a method for nodule detection and nodule feature extraction using background contextual information according to an embodiment of the present invention. As illustrated in FIG. 2, at step 202 a chest x-ray image is received. The image can be received directly from an image acquisition device, such as an x-ray imaging device. Alternatively, the image can be received by loading an image, stored on a computer readable medium, or memory or storage of a computer system.

At step 204, nodule candidates are detected in the chest x-ray image. For example, nodule candidates can be detected by a computer aided automatic nodule detection method. For example, any well-known automatic nodule detection method can be utilized to detect nodule candidates in the chest x-ray image. In an advantageous implementation, a multi-filter based nodule detection method can be used for nodule candidate detection in the chest x-ray image. The multi-filter based nodule candidate detection method includes of a number of relatively independent processing stages. First, a multiscale filtering stage is performed, in which a number of filtered images are generated using filters that are tuned to nodules in a certain range. Next, a nodule candidate detection stage is performed, in which a local peak detection algorithm using multiple thresholding based shape analysis is applied to each of the filtered images. Then, a fusion stage is performed, in which detection results from different filtered images are fused together to produce the final detection result. The final detection result gives points and the estimated size in the chest x-ray image that are nodule candidates.

At step 206, background contextual information is defined in the chest x-ray image. For the nodule feature extraction, background contextual information refers to prominent background structures inside lung regions that complicate the detection of genuine nodules. Ideally, if the background structures are well defined, then a precise segmentation of the background structures may be obtained, which forms a valid representation of the background contextual information. However, contextual background structures in a chest x-ray images may not always be well defined. In this case, the background contextual information may be defined by a pseudo-segmentation of the background structures with a concentration focused on labeling significant intensity and/or structure abnormalities.

According to an embodiment of the present invention, the vessel tree can be the prominent background structure in the chest x-ray image that affects accuracy of nodule detection. Accordingly, the representation of the vessel tree can be used to define the background contextual information of the chest x-ray image. Vessel trees in a chest x-ray image are a 2D projection of 3D vessels into the image plane. Vessel trees generally form clusters of high intensity regions near the low inside boundary of both lung lobes. The vessel trees are highly irregular and non-uniform, and there may be no clearly defined boundary. The intensity becomes weaker as the vessels trees extend to outer regions of the lung lobes. For these reasons, it can be very difficult to form a precise segmentation of the vessel trees. In order to define the background contextual information, a pseudo-segmentation of the vessel regions in the chest x-ray image is generated. The representation of the vessel trees is established using a multi-level representation schema with decreasing confidence levels. At the highest confidence level, the vessel tree is represented by a pair of predefined templates as starting shapes. With the progressive decrease of the confidence levels, additional vessel tree clusters are propagated and merged with the vessel tree regions that are already propagated. The propagated vessel tree regions form a global background context, which provides important clues to differentiate between nodule-like vessel tree structures and genuine nodules.

Figure 3:
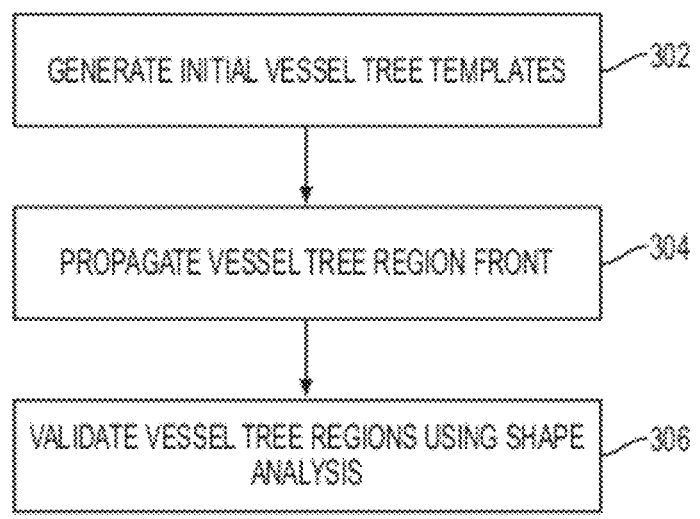
FIG. 3 illustrates a method of vessel tree propagation for defining background contextual information according to an embodiment of the present invention.
Figure 4:
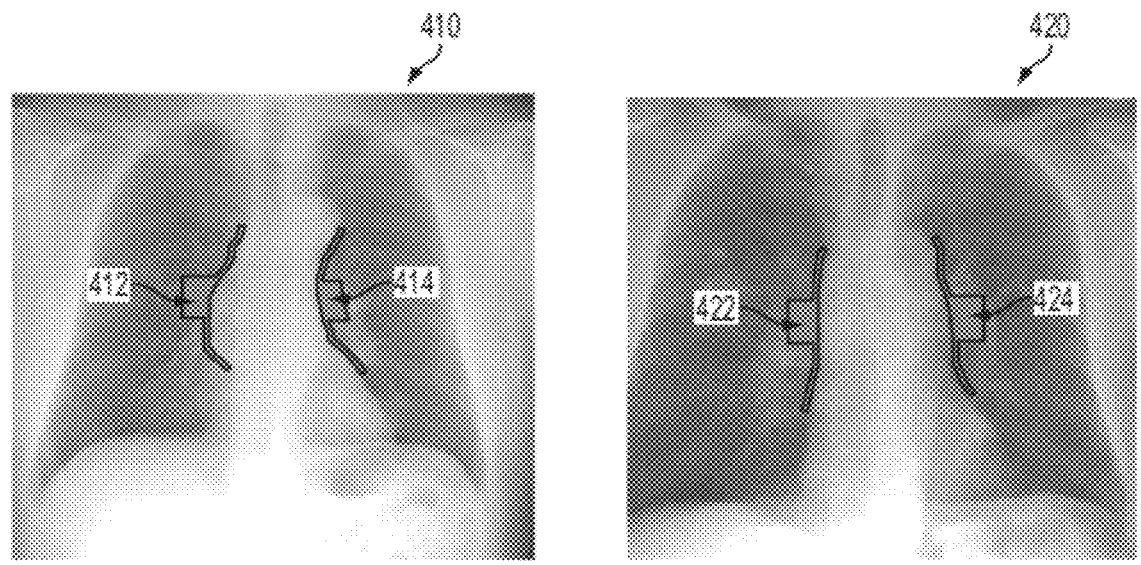
FIG. 4 illustrates exemplary initial vessel tree templates.

FIG. 3 illustrates a method of vessel tree propagation for defining background contextual information according to an embodiment of the present invention. The method of FIG. 3 uses a controlled marching process operating on a combination of the raw chest x-ray image and a gradient image of the chest x-ray image. The method of FIG. 3, assumes that both lung lobes are pre-segmented and labeled. The lungs can be segmented using any well-known lung segmentation algorithm. As illustrated in FIG. 3, at step 302, initial vessel tree templates are generated. The method starts from a pair of initial template shapes that are placed at the low inside boundaries of the segmented lung lobes. The initial vessel tree template shapes are a pair of binary blocks with a predefined shape that are refined and placed at the low inner boundaries of segmented lung masks. They provide the initial front of the vessel tree regions, starting from which the rest of the vessel tree regions are generated. The placement of the initial vessel tree templates may not be critical, as long as they are located approximately at the low inner boundaries of the segmented lung lobes. FIG. 4 illustrates exemplary initial vessel tree templates. As illustrated in FIG. 4, image 410 is a chest x-ray image showing initial vessel tree templates 412 and 414, and image 420 is a chest x-ray image showing initial vessel tree templates 422 and 424.

Returning to FIG. 3, at step 304, the vessel tree region front is propagated. From the initial vessel tree templates, vessel tree regions are labeled progressively using a front propagation algorithm at multiple confidence intervals. The motivation behind the idea of front propagation is to control the formation of vessel trees and to generate contextual information for the later feature extraction process, instead of a plain pixel classification using intensity and/or texture features. In the front propagation process, only pixels that are within a small neighborhood of the previously propagated vessel tree regions are evaluated for possible propagation. If a pixel satisfies the confidence level constraint, the pixel is propagated. Let I(x,y) be the raw intensity image, G(x,y) be the gradient image, the confidence value C(x,y) at a pixel (x,y) is computed as:

$$C(x, y) = \begin{cases} aG(x, y) + bI(x, y) + \\ (1 - a - b)K(x, y) & \text{if } (x, y) \text{ is next to a propagated pixel,} \\ 0 & \text{otherwise.} \end{cases}$$

where K(x,y) represents the accumulated distance at (x,y) along the trace of front propagation, a<1 and b<1 are weighting parameters which are set to 0.4 and 0.2, respectively. Multiple levels of confidence are pre-established as control thresholds. At each level of control thresholds, the fronts of current vessel tree regions are propagated as long as there are a sufficient number of front pixels with their confidence value larger than the control threshold. FIG. 5 illustrates pseudo-code 500 for implementation the front propagation algorithm according to an embodiment of the present invention. As shown the pseudo-code 500, four confidence levels can be used for propagation of the vessel tree region front in an advantageous implementation.

Figure 6:
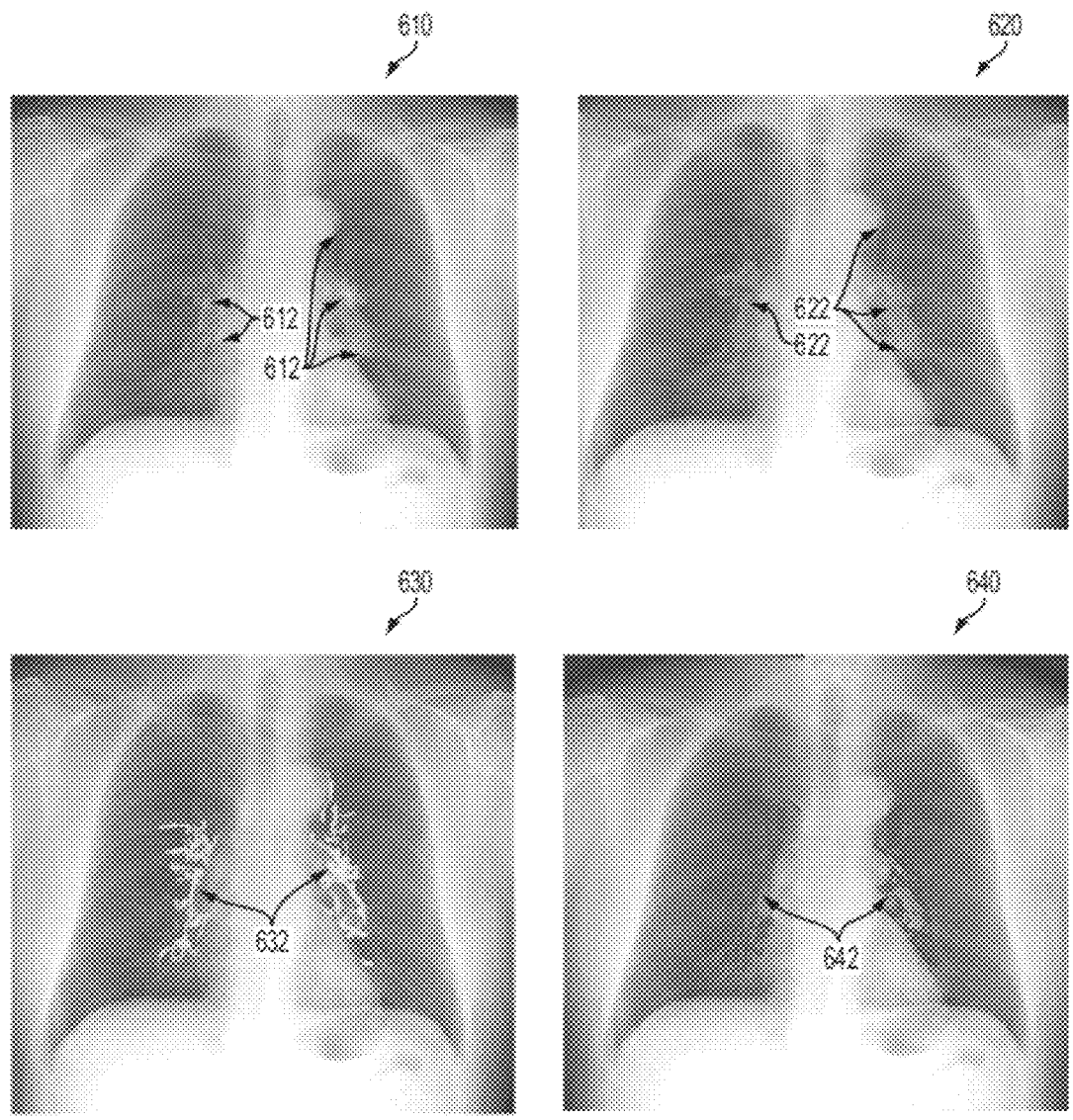
FIG. 6 illustrates exemplary propagated vessel tree regions.

Returning to FIG. 3, at step 306, the vessel tree regions generated by the propagation are validated using shape analysis. If a propagated vessel tree region forms a well defined isolated island or other regular shape, it is removed from the vessel tree representation. In the validation process, the vessel tree regions are assessed both independently and in combination with the vessel tree regions generated in the previous propagation iterations. In addition to the newly propagated vessel tree regions, the background regions enclosed by vessel tree regions are also evaluated. If a regular shaped small background island (hole) is identified, then the vessel tree regions are expanded to the isolated hole. Once the vessel tree regions are validated, the remaining propagated vessel tree regions are the representation of the vessel trees that defines the background contextual information used for nodule feature extraction. FIG. 6 illustrates exemplary propagated vessel tree regions. As illustrated in FIG. 6, images 610, 620, 630, and 640 show a chest x-ray image with propagated vessel tree regions 612, 622, 632, and 642, respectively, at different levels of confidence from high to low.

Returning to FIG. 2, at step 208, features are extracted for the nodule candidates based on the background contextual information. In conventional nodule feature extraction algorithms described above, a nodule is either explicitly or implicitly modeled as an overlay of two separate intensity formations: (1) the round shaped nodule blob and (2) the lung background which may contain different structures. Except for a few large and/or dense nodules, genuine nodules typically exhibit as weak round shaped blobs added to the underlying background structures. Feature computation within a limited region of interest of a nodule, such as the peak support region used by the matching filtering based techniques and the exploration ring range used by the adaptive ring filtering based techniques, is not able to reveal the subtle difference between genuine nodules and false positive background structures in image properties. As observed by the present inventors, it is actually the relationship between a nodule and the underlying background structures (e.g., vessel trees) that is effective in differentiating a false positive from a genuine nodule. Therefore, under background vessel tree context, the nodule feature extraction method focuses on assessing the relationship of a susceptible nodule with the labeled vessel tree structures, according to an embodiment of the present invention.

An explicit approach for extracting nodule features under vessel tree context can include establishing a large neighborhood or even a global neighborhood, deriving a quantitative representation of the vessel tree background contextual information within a neighborhood region, and calculating nodule features using the quantified background contextual information as pre-conditions. It is not difficult to define a large neighborhood region for vessel tree context. However, to derive an effective quantitative representation of the vessel tree context in a neighborhood region is not an easy task. The formation of vessel trees is extremely complex. It is difficult to derive a valid quantitative measure that is meaningful for conditional nodule feature computation. According to an advantageous implementation, an implicit approach may be better suited for the nodule feature extraction under the vessel tree context. In the process of multi-level propagation of the vessel tree regions described above, a major concentration is focused on the propagation of the boundary regions of vessel trees. If there is no abnormality such as nodule inside vessel tree regions, the propagation algorithm tends to fill all the non-boundary parts of the vessel trees. However, if there is a nodule inside a vessel tree region, the propagation algorithm tends to leave an empty region un-propagated or propagate the region around the nodule at the low confidence level. Therefore, the properties of an un-propagated empty region within a neighborhood of a nodule candidate represent important differentiating properties, which implicitly depend on large background contextual information of the vessel trees.

According to an embodiment of the present invention, a set of four features are derived by analyzing the properties of the region enclosed by vessel trees and covered by the extended region of interest of a nodule candidate. In order to extract these features for each nodule candidate, a region of interest is estimated for each candidate. The region of interest for each candidate is a circular region approximately covering the candidate. As described above, the size and location of the candidate is estimated in the candidate generation algorithm. The extended covering region of interest for each candidate is defined as the circular region that is an expansion of the original circular region of interest to twice the size of the original region of interest. Within the defined region of interest, the following four features (i.e., first, second, third, and fourth features, respectively) are calculated:
1. a regular shape feature of an empty region at the highest possible confidence level where the candidate point is in the background region;
2. the average propagation distance of vessel tree pixels next to the empty region at the highest possible confidence level;
3. the relative size of the empty region with respect to the covering region of interest at the possible highest confidence level; and
4. the weighted sum of confidence levels of boundary pixels in vessel tree regions that are next to the empty region.

Note that even though the first, second, third, and fourth features are computed within a local region of interest, they actually represent the relationships between regions of interest and overall vessel trees, which are of global in nature. Although, four features are described herein, the present invention is not limited thereto. For example, more subtle relationships between the vessel tree regions and nodules can be derived and extracted as features.

At step 210, false positive nodule candidates and genuine nodules are detected based on the extracted features. For example, each of the features extracted for each candidate nodule based on the background contextual information, such as the first, second, third, and fourth features described above, can be compared to a corresponding threshold in order to determine whether each nodule candidate is a false positive or a genuine nodule. This detection of false positives and genuine nodules can confirm the presence of actual nodules, while eliminating false positives erroneously detected using an automatic nodule detection algorithm. These features can also be used as inputs to other classification schemes to differentiate genuine nodules from false positives. For example, these features can be used to train a learning base classifier to differentiate genuine nodules from false positives.

Figure 7:
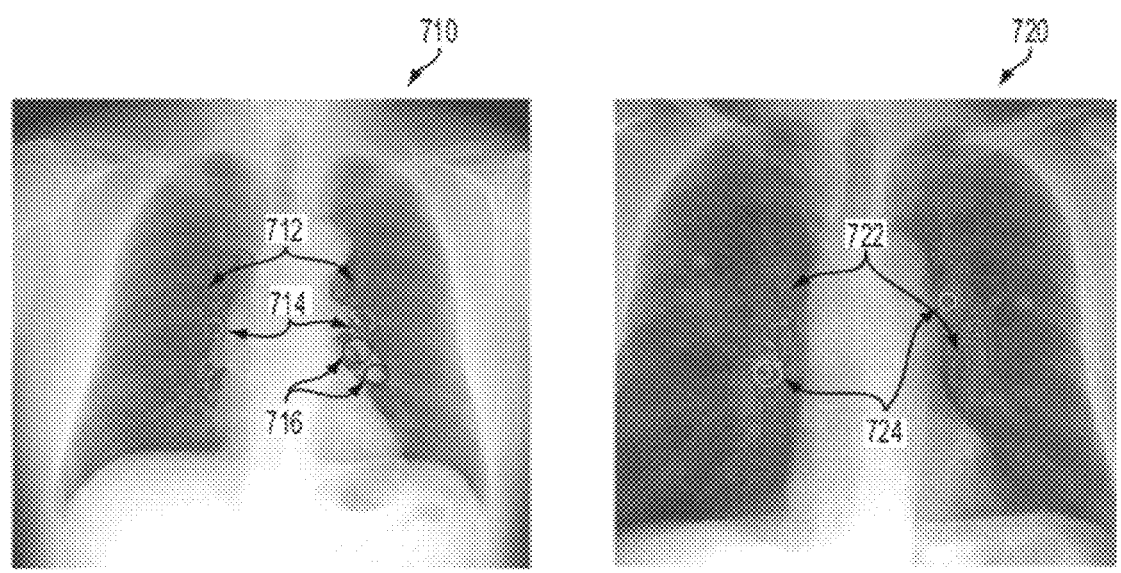
FIG. 7 illustrates exemplary false positives and genuine nodules covering vessel regions in chest x-ray images.

FIG. 7 illustrates exemplary false positives and genuine nodules covering vessel regions in chest x-ray images. As illustrated in FIG. 7, image 710 is a chest x-ray image showing the propagated vessel regions 712, false positive nodule candidates 714, and genuine nodules 716. Image 720 is a chest x-ray image showing the propagated vessel regions 722 and false positive nodule candidates 724.

As described above, embodiments of the present invention provide a feature extraction method that uses vessel trees as background contextual information and calculates relationship properties of nodule candidates with the vessel tree context in order to extract the nodule features. These features greatly improve the effectiveness of a nodule detection algorithm in the regions where vessel tree structures are dominant and a significant number of indistinguishable false positives appear using conventional techniques. Accordingly, embodiments of the present invention explore the difference between a nodule and the underlying background structures instead of finding the most prominent image properties. According to an advantageous implementation, the nodule feature extraction method described above can be used in later stage filtering for detecting false positives and genuine nodules.

Figure 8:
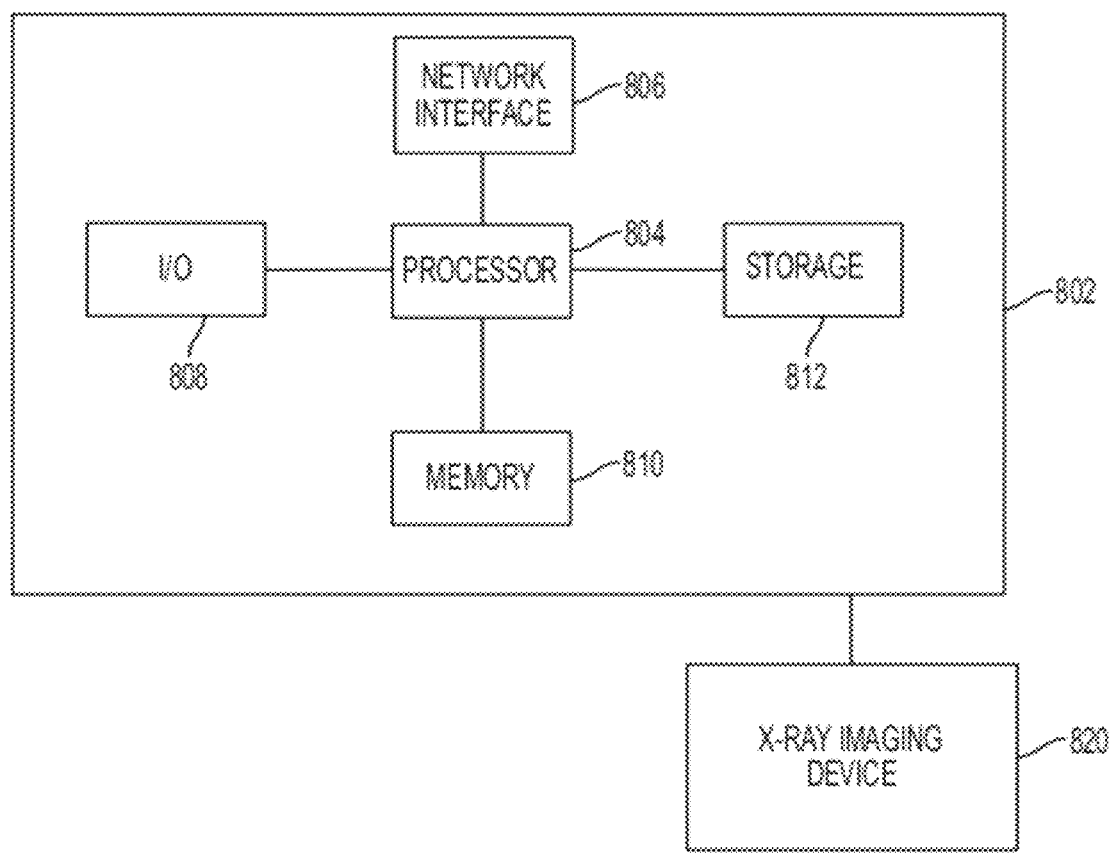
FIG. 8 is a high level block diagram of a computer capable of implementing the present invention.

The above-described methods for extracting nodule features using background contextual information in chest x-ray images (radiographs), vessel tree propagation, and nodule detection, may be implemented on a computer using well-known computer processors, memory units, storage devices, computer software, and other components. A high level block diagram of such a computer is illustrated in FIG. 8. Computer 802 contains a processor 804 which controls the overall operation of the computer 802 by executing computer program instructions which define such operation. The computer program instructions may be stored in a storage device 812 (e.g., magnetic disk) and loaded into memory 810 when execution of the computer program instructions is desired. Thus, the method steps of FIGS. 2, 3, and 5 can be defined by the computer program instructions stored in the memory 810 and/or storage 812 and controlled by the processor 804 executing the computer program instructions. For example, the computer program instructions can be implemented as computer executable code programmed by one skilled in the art to perform an algorithm defined by the method steps of FIGS. 2, 3, and 5. Accordingly, by executing the computer program instructions, the processor 804 executes an algorithm defined by the method steps of FIGS. 2, 3, and 5. An X-ray imaging device 820 can be connected to the computer 802 to input X-ray radiographs to the computer 802. It is possible to implement the X-ray imaging device 820 and the computer 802 as one device. It is also possible that the X-ray imaging device 820 and the computer 802 communicate wirelessly through a network. The computer 802 also includes one or more network interfaces 806 for communicating with other devices via a network. The computer 802 also includes other input/output devices 808 that enable user interaction with the computer 802 (e.g., display, keyboard, mouse, speakers, buttons, etc.) One skilled in the art will recognize that an implementation of an actual computer could contain other components as well, and that FIG. 8 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for extracting nodule features in a chest x-ray image for detecting false positives in nodule candidates, comprising:
generating a representation of vessel trees in the chest x-ray image, the representation of the vessel trees defining background contextual information in the chest x-ray image;
extracting at least one feature for each of the nodule candidates based on the background contextual information; and
detecting false positives in the nodule candidates based on the at least one feature detected for each of the nodule candidates.

2. The method of claim 1, further comprising:
detecting the nodule candidates in the chest x-ray image using an automatic nodule detection method.

3. The method of claim 2, wherein said step of detecting the nodule candidates in the chest x-ray image comprises:
detecting the nodule candidates in the chest x-ray image using a multi-filter based nodule detection method.

4. The method of claim 1, wherein said step of generating a representation of vessel trees in the chest x-ray imam comprises:
generating initial vessel tree templates in the chest x-ray image;
propagating vessel tree regions from the initial vessel tree templates; and
validating the propagated vessel tree regions using shape analysis.

5. The method of claim 4, wherein said step of generating initial vessel tree templates comprises:
generating the initial vessel tree templates at low inner boundaries of lung regions in the chest x-ray image.

6. The method of claim 4, wherein said step of propagating vessel tree regions from the initial vessel tree templates comprises:
propagating vessel tree regions from the initial vessel tree templates at a plurality of different confidence levels.

7. The method of claim 6, wherein said step of extracting at least one feature for each of the nodule candidates based on the background contextual information comprises, for each nodule candidate:
extracting a first feature for the nodule candidate by calculating a regular shape of an empty region within a region of interest associated with the nodule candidate, said empty region enclosed by vessel trees propagated at a highest confidence level;
extracting a second feature for the nodule candidate by calculating an average propagation distance of vessel tree pixels next to said empty region at the highest confidence level;
extracting a third feature for the nodule candidate by calculating a relative size of said empty region with respect to said region of interest at the highest confidence level; and
extracting a fourth feature for the nodule candidate by calculating a weighted sum of confidence levels of boundary pixels in vessel tree regions that are next to said empty region.

8. The method of claim 1, wherein said background contextual information is the representation of vessel trees in lung regions of the chest x-ray image, and said step of extracting at least one feature for each of the nodule candidates based on the background contextual information comprises:
extracting at least one feature representing a relationship between each of the nodule candidates and the vessel trees in the chest x-ray image.

9. The method of claim 1, wherein said step of detecting false positives in the nodule candidates based on the at least one feature detected for each of the nodule candidates comprises:
comparing said at least one feature extracted for each nodule candidate to a threshold to determine whether each nodule candidate is a false positive or a genuine nodule.

10. An apparatus for extracting nodule features in a chest x-ray image for detecting false positives in nodule candidates, comprising:
means for generating a representation of vessel trees in the chest x-ray image, the representation of the vessel trees defining background contextual information in the chest x-ray image;
means for extracting at least one feature for each of the nodule candidates based on the background contextual information; and
means for detecting false positives in the nodule candidates based on the at least one feature detected for each of the nodule candidates.

11. The apparatus of claim 10, further comprising:
means for detecting the nodule candidates in the chest x-ray image using an automatic nodule detection method.

12. The apparatus of claim 10, wherein said means for generating are representation of vessel trees in the chest x-ray image comprises:
means for generating initial vessel tree templates in the chest x-ray image;
means for propagating vessel tree regions from the initial vessel tree templates; and
means for validating the propagated vessel tree regions using shape analysis.

13. The apparatus of claim 12, wherein said means for propagating vessel tree regions from the initial vessel tree templates comprises:
means for propagating vessel tree regions from the initial vessel tree templates at a plurality of different confidence levels.

14. The apparatus of claim 13, wherein said means for extracting at least one feature for each of the nodule candidates based on the background contextual information comprises:
- means for extracting a first feature for a nodule candidate by calculating a regular shape of an empty region within a region of interest associated with the nodule candidate, said empty region enclosed by vessel trees propagated at a highest confidence level;
- means for extracting a second feature for the nodule candidate by calculating an average propagation distance of vessel tree pixels next to said empty region at the highest confidence level;
- means for extracting a third feature for the nodule candidate by calculating a relative size of said empty region with respect to said region of interest at the highest confidence level; and
- means for extracting a fourth feature for the nodule candidate by calculating a weighted sum of confidence levels of boundary pixels in vessel tree regions that are next to said empty region.

15. The apparatus of claim 10, wherein said background contextual information is the representation of vessel trees in lung regions of the chest x-ray image, and said means for extracting at least one feature for each of the nodule candidates based on the background contextual information comprises:
- means for extracting at least one feature representing a relationship between each of the nodule candidates and the vessel trees in the chest x-ray image.

16. The apparatus of claim 10, wherein said means for detecting false positives in the nodule candidates based on the at least one feature detected for each of the nodule candidates comprises:
- means for comparing said at least one feature extracted for each nodule candidate to a threshold to determine whether each nodule candidate is a false positive or a genuine nodule.

17. A computer readable medium encoded with computer executable instructions for extracting nodule features in a chest x-ray image for detecting false positives in nodule candidates, the computer executable instructions defining steps comprising:
- generating a representation of vessel trees in the chest x-ray image, the representation of the vessel trees defining background contextual information in the chest x-ray image;
- extracting at least one feature for each of the nodule candidates based on the background contextual information; and
- detecting false positives in the nodule candidates based on the at least one feature detected for each of the nodule candidates.

18. The computer readable medium of claim 17, further comprising computer executable instructions defining the step of:
- detecting the nodule candidates in the chest x-ray image using an automatic nodule detection method.

19. The computer readable medium of claim 17, wherein the computer executable instructions defining the step of generating a representation of vessel trees in the chest x-ray image comprise computer executable instructions defining the steps of:
- generating initial vessel tree templates in the chest x-ray image;
- propagating vessel tree regions from the initial vessel tree templates; and
- validating the propagated vessel tree regions using shape analysis.

20. The computer readable medium of claim 19, wherein the computer executable instructions defining the step of propagating vessel tree regions from the initial vessel tree templates comprise computer executable instructions defining the step of:
- propagating vessel tree regions from the initial vessel tree templates at a plurality of different confidence levels.

21. The computer readable medium of claim 20, wherein the computer executable instructions defining the step of extracting at least one feature for each of the nodule candidates based on the background contextual information comprise computer executable instructions defining the steps of, for each nodule candidate:
- extracting a first feature for the nodule candidate by calculating a regular shape of an empty region within a region of interest associated with the nodule candidate, said empty region enclosed by vessel trees propagated at a highest confidence level;
- extracting a second feature for the nodule candidate by calculating an average propagation distance of vessel tree pixels next to said empty region at the highest confidence level;
- extracting a third feature for the nodule candidate by calculating a relative size of said empty region with respect to said region of interest at the highest confidence level; and
- extracting a fourth feature for the nodule candidate by calculating a weighted sum of confidence levels of boundary pixels in vessel tree regions that are next to said empty region.

22. The computer readable medium of claim 17, wherein said background contextual information is the representation of vessel trees in lung regions of the chest x-ray image, and the computer executable instructions defining the step of extracting at least one feature for each of the nodule candidates based on the background contextual information comprise computer executable instructions defining the step of:
- extracting at least one feature representing a relationship between each of the nodule candidates and the vessel trees in the chest x-ray image.

23. The computer readable medium of claim 17, wherein the computer executable instructions defining the step of detecting false positives in the nodule candidates based on the at least one feature detected for each of the nodule candidates comprise computer executable instructions defining the step of:
- comparing said at least one feature extracted for each nodule candidate to a threshold to determine whether each nodule candidate is a false positive or a genuine nodule.

* * * * *